US 9,694,547 B2

(12) United States Patent
Göttinger et al.

(10) Patent No.: US 9,694,547 B2
(45) Date of Patent: *Jul. 4, 2017

(54) DEVICE AND METHOD FOR PRODUCING FIBER PREFORMS

(71) Applicant: Voith Patent GmbH, Heidenheim (DE)

(72) Inventors: Marco Göttinger, München (DE); Michael Kaiser, München (DE)

(73) Assignee: Voith Patent GmbH, Heidenheim (DE)

( * ) Notice: Subject to any disclaimer, the term of this patent is extended or adjusted under 35 U.S.C. 154(b) by 755 days.

This patent is subject to a terminal disclaimer.

(21) Appl. No.: 14/048,756

(22) Filed: Oct. 8, 2013

(65) Prior Publication Data

US 2014/0131914 A1   May 15, 2014

Related U.S. Application Data

(63) Continuation of application No. PCT/EP2012/051290, filed on Jan. 27, 2012.

(30) Foreign Application Priority Data

Apr. 8, 2011   (DE) .................. 10 2011 007 021

(51) Int. Cl.
| | |
|---|---|
| B29C 70/20 | (2006.01) |
| B29C 70/56 | (2006.01) |
| B29B 11/16 | (2006.01) |
| B29C 70/38 | (2006.01) |
| B29C 70/54 | (2006.01) |

(52) U.S. Cl.
CPC ............. B29C 70/56 (2013.01); B29B 11/16 (2013.01); B29C 70/382 (2013.01); B29C 70/541 (2013.01); B29C 70/207 (2013.01); B29C 2793/0027 (2013.01); B29C 2793/0081 (2013.01)

(58) Field of Classification Search
CPC ...... B29C 70/38; B29C 70/384; B29C 70/382
See application file for complete search history.

(56) References Cited

U.S. PATENT DOCUMENTS 6,045,651 A * 4/2000 Kline .................. B29C 70/342
156/285
9,364,997 B2 * 6/2016 Gottinger ............ B29C 70/382
(Continued)

FOREIGN PATENT DOCUMENTS

| | | |
|---|---|---|
| DE | 199 22 799 A1 | 11/2000 |
| DE | 10 2008 011 658 A1 | 9/2009 |
| DE | 10 2008 042 574 A1 | 4/2010 |

OTHER PUBLICATIONS

International Search Report dated May 3, 2012 for International Application No. PCT/EP2012/051290 (4 pages).

*Primary Examiner* — Galen Hauth
(74) *Attorney, Agent, or Firm* — Taylor IP, P.C.

(57) ABSTRACT

A device for producing fiber preforms including a plurality of unwind stations, a plurality of grippers and at least one first molding tool. Further, a method includes the successive steps of tensioning threads or rovings for a first layer with grippers, draping the first layer over a first molding tool, severing of the threads or rovings of the first layer, tensioning threads or rovings for a second layer with grippers, draping an additional layer over the first forming tool, and severing the threads or rovings of the second layer.

10 Claims, 9 Drawing Sheets

(56) References Cited

U.S. PATENT DOCUMENTS

2008/0202691 A1     8/2008  Hamlyn et al.
2010/0200168 A1*    8/2010  Oldani ................. B29C 70/382
                                                          156/441
2011/0000608 A1*    1/2011  Bech ....................... B29B 11/16
                                                          156/166

* cited by examiner

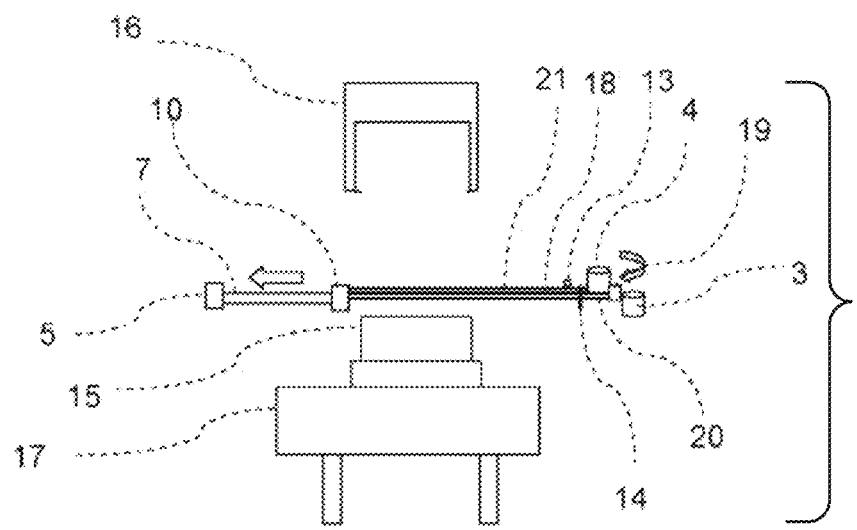
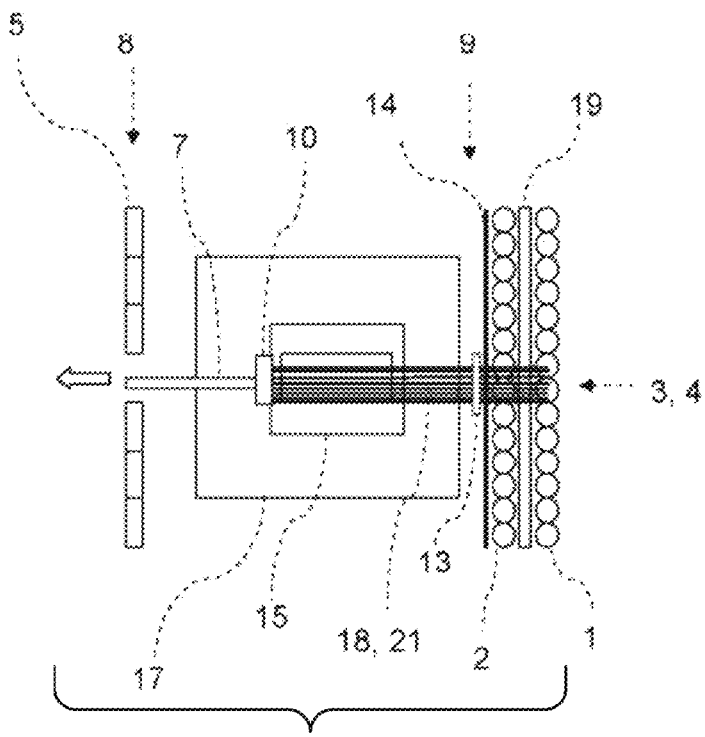
FIG. 2A
FIG. 2B

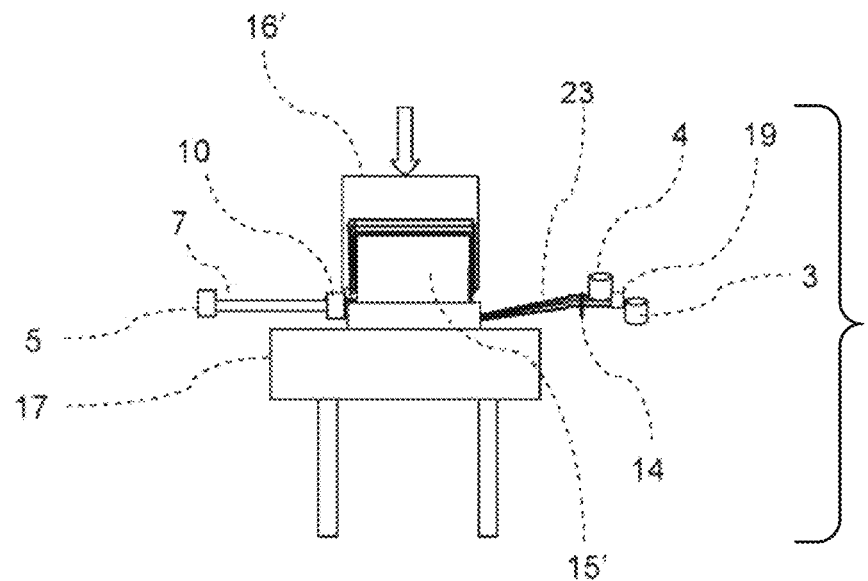
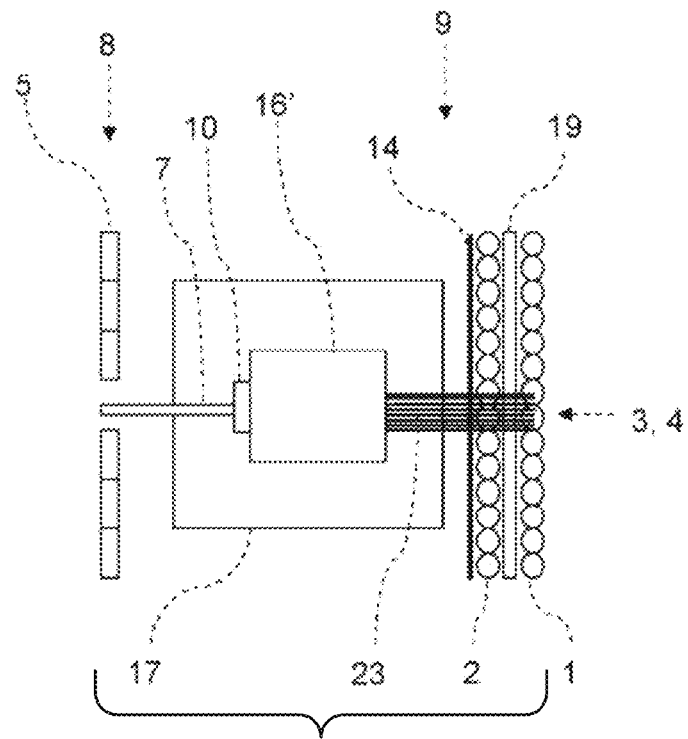

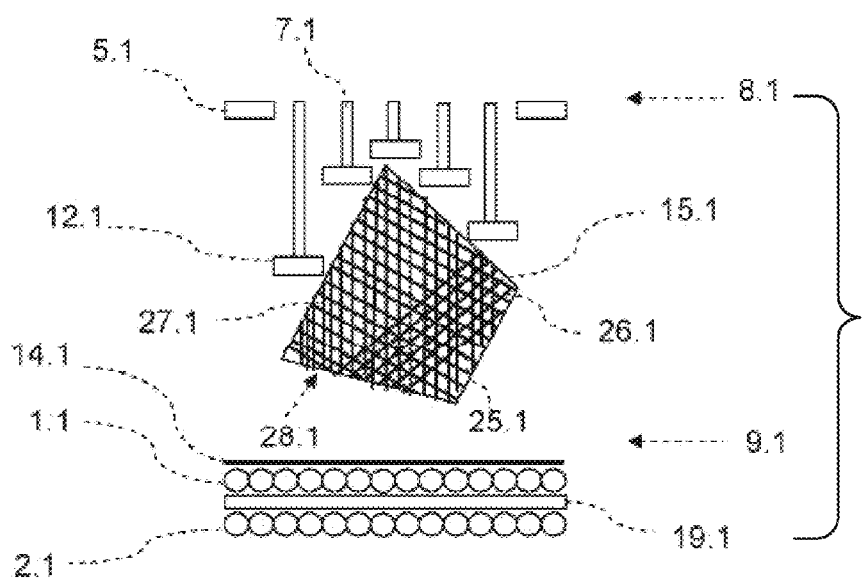

DEVICE AND METHOD FOR PRODUCING FIBER PREFORMS

CROSS REFERENCE TO RELATED APPLICATIONS

This is a continuation of PCT application No. PCT/EP2012/051290, entitled "DEVICE AND METHOD FOR PRODUCING FIBER PREFORMS, WHICH ARE A PRECURSOR IN THE PRODUCTION OF FIBER REINFORCED PLASTIC COMPONENTS IN PARTICULAR", filed Jan. 27, 2012, which is incorporated herein by reference.

BACKGROUND OF THE INVENTION

1. Field of the Invention

The present invention relates to a device for producing fiber preforms, which in particular are a precursor in the production of fiber reinforced plastic components. The present invention moreover relates to a method—in particular when using the device—for producing fiber preforms, which are for example a precursor in the production of fiber reinforced plastic components.

2. Description of the Related Art

Fiber reinforced plastic consists of a matrix material which, among other factors provides the stiffness, and of fibers which are embedded into the matrix material and which, among other factors provide the tensile strength. Fiber reinforced plastic is used in particular for highly stressed components which nevertheless need to be as light as possible. Since the fibers do not provide strength in a transverse direction, the fibers must be oriented such that their longitudinal direction conforms as closely as possible to the respective load direction. In order to achieve this, the fibers must often be laid in different directions. The better and more precisely the positioning of the fibers is adapted to the load, the better the component will be. There are numerous production methods for fiber reinforced plastic components. Methods which are particularly appropriate for the production of large quantities are, however, currently only available for rotationally symmetrical or plate-shaped or respectively line-shaped components through winding or plate-pressing or respectively extrusion.

In contrast, more complex high-grade 3-D structures can only be produced at high cost, since production of the required fiber preforms is difficult, slow and expensive. High grade structures are generally produced from continuous fibers. In many processes, fiber preforms, are initially produced according to the desired three-dimensional component shape—so-called preforms—which consist predominantly of fibers which are often arranged in several layers on top of one another to achieve the necessary fiber orientation. Afterwards, the fiber preforms are impregnated or coated with the matrix material, sometimes also pressed and finally cured. For the production of the fiber preforms, as well as for impregnation and/or curing of the components, molding tools according to the desired component shape can be used onto or into which the fiber preform or the component is placed and/or pressed.

So that the fiber preforms possess sufficient dimensional stability for further processing, they are provided with small amounts of adhesives or binding agents and, following the three-dimensional draping are fixed, for example by means of drying or heating and cooling.

The fiber preforms are usually created through placing on top of one another and fixing of prefabricated and pre-joined flat semi-finished product. Such semi-finished products are for example tapes or fabrics, laid thread structure or nonwovens, wherein a multitude of individual threads or rovings are already woven, sewn or agglutinated into a flat fabric. One refers to "thread" in the use of so-called continuous fibers, in other words if the fibers are unwound from a spool or from a ball of thread. Numerous threads which are unwound untwisted simultaneously from a spool or a ball of thread are referred to as thread bundle or roving. The rovings can hereby consist of several tens of thousands of individual threads which are also referred to as filaments.

The required individual parts are cut to size according to a type of pattern from a flat semi-finished product which is usually available in the form of a roll product, as is known from DE 10 2008 011 658 A1. Then they are placed over a molding tool and joined with each other or pressed together. One example for the production of such semi-finished products by means of agglutination or sewing is also given in DE 10 2008 011 658 A1. In spite of everything however, a large amount of manual actions are often necessary. A device for machine production of simple single-dimensional curved preforms with sections of semi-finished product which are pre-stored in a cartridge and are then deposited on a core, is known from DE 10 2008 042 574 A1. More complex forms cannot yet be produced by machine.

Another possibility for producing fiber preforms for more complex components is automated fiber placement. Here, narrow thread bundles or ribbons from thread bundles guided back and forth over the molding tool by a fiber placement head, and are thereby placed adjacent and on top of one another on the molding tool, pressed onto it and fixed. For more complex components, an expensive robotic control of the fiber placement head is necessary. Even when using two, three or even four parallel fiber placement heads the production speed is still relatively slow, since the heads often have to travel long distances and since they are working successively with narrow fiber bundles. Moreover, they have a very long and complicated thread-tracking from the creel to the multi-axial moving placement head. Such thread-tracking in flexible tubes with special guide blades to prevent turning of the rovings is shown, for example, in U.S. 2008/0202691 A1.

What is needed in the art is a device and a method for production of fiber preforms, so that also more complex high grade structures can be more easily automated, and manufactured faster and cheaper, however remaining flexible in shape and thread orientation.

SUMMARY OF THE INVENTION

The device according to the present invention generally includes a plurality of unwind stations for the provision of a plurality of threads or rovings, a plurality of grippers which can respectively grip individual or a plurality of threads or rovings at their origin, and at least one first molding tool. Each gripper is movable on a path between a maximum position and a pick-up position. The pick-up position is provided at a thread transfer point and is closer to the unwind station than the maximum position.

The present invention more specifically provides a device including a first molding tool having a draping position in the region of the connecting lines between the maximum positions and the thread transfer points, and a starting position outside the connecting lines. The first molding tool is rotatable and/or tiltable at least in the starting position and can also be moved into the respective draping position when rotated and/or tilted. Thus, due to simple, for example linear, paths for the grippers, a plurality of threads or rovings can be tensioned simultaneously and nevertheless several layers having different orientations can be draped successively on the molding tool. The unwind stations as well as thread guidance through the grippers can remain stationary. The desired orientation of the layer in regard to the eventual component can be achieved through rotation of the molding tool. Thus, a very flexible arrangement of the fiber preforms, and nevertheless a simple automation without complicated calculations of the thread travel paths is possible. The device is thereby configured such that it is capable of placing threads or roving material at rates of more than 2 kilograms per minute (kg/min) or even more than 3 kg/min.

Since the otherwise customary flat, semi-finished products are being foregone and instead the fiber preform is draped and produced directly from threads or rovings, material costs compared to known methods are much lower. A short production time can nevertheless be achieved through parallelization. The flat, semi-finished products are quite expensive because of prefabrication. With strongly three-dimensional components there is the additional risk of wrinkling when using large area, semi-finished products. In small area components on the other hand, the expenditure for cutting and joining of the individual components increases.

Advantageously a second molding tool is provided which can be brought together with the first molding tool in the draping position and which has its own starting position. Thus, also more complicated three-dimensional shapes can be produced in that a group of threads or rovings is draped or respectively reshaped between the two molding tools. Viewed from the first molding tool, the second molding tool is, for example arranged on the opposite side of the tensioned threads or rovings. The movement into the draping position can occur for the second molding tool, for example simultaneously with, or after the first molding tool. It can however also occur before the first molding tool. The first and/or second molding tool may be configured as a multi-component unit.

In order to achieve the best possible drape in the desired shape, the direction of movement between the starting position and the draping position of the first and/or a second molding tool should, for example, be arranged substantially perpendicular to the paths of the grippers. A deviation of up to +/−30° is however conceivable. The paths of the grippers may be approximately horizontal and the direction of movement of the molding tool approximately vertical. For both directions a deviation of up to +/−30° is also conceivable. The paths of the grippers, for example, coincide approximately with the tensioned threads or rovings before draping.

The second molding tool may also be rotatable and/or tiltable, at least in the starting position, and can be moved in rotated and/or tilted position into the draping position. The rotation and/or tilt will be corresponding to that of the first molding tool. Thus, after or during the draping process of an additional layer with a different fiber orientation on the first molding tool, the second molding tool can be brought together, fitting with the first molding tool. The second molding tool is, for example, in the embodiment of a hood which fits over the first molding tool and whereby a gap remains for the threads or rovings between the first and second molding tool. The threads or rovings are thereby brought precisely into the desired shape, that is draped.

In the draping process it is important that the tension of the threads or rovings is adjusted or controlled. If necessary, it can be readjusted during draping, for example in the case of strongly three-dimensional components in which the threads or rovings are strongly deflected during draping. Therefore, a tensioning unit may be provided for adjustment and/or control of the tension. A tensioning unit which can keep the tension constant or within a predetermined range during draping may be, for example, provided.

According to the present invention, the axis of rotation of the first and/or of a second molding tool can be positioned substantially perpendicular to the paths and substantially parallel to the direction of movement between the starting position and the draping position of the first and/or second molding tool.

The first and/or a second molding tool can moreover be equipped with a heating device and/or a pressing unit. A binder already present in the layer can be activated through temperature or pressure increase, so that the threads or rovings are fixed in the predetermined shape and are initially joined into a layer and then into the fiber preform. Binder materials, for example threads or fleeces which consist at least partially of thermoplastic or adhesive can be draped at the same time. Thus, the binder material necessary for fixing is applied at the same time with the fibrous material. The binder material may also be introduced by hybrid threads containing binder material in addition to fibrous material, or by coating or spraying of the threads or rovings. The binder material may also be applied after draping of the threads and rovings over a molding tool, for example by spraying. Fixing of one layer of threads or rovings provides certain stability for the placement of an additional layer of threads or rovings, or for further processing of the fiber preform.

In order to make a simple and flexible adaptation to various component shapes possible, the first and/or a second molding tool can be attached to a motion device, so as to be easily detachable, for example on a lifting table or a lowering device. Thus, one or several layers of threads or rovings can be passed on, together with a molding tool to a subsequent and in particular to an again inventively arranged device, in order to place one or more additional layers there.

The supply of the device with threads or rovings occurs through the unwind stations. The unwind stations may, for example, be in the embodiment of so-called creels. The threads or rovings can hereby be drawn from the spools or balls of thread (bobbins). Each thread transfer point receives threads or rovings from one or more unwinding stations. On the spool or at the thread transfer point, or between them, a device for controlling or adjusting the thread tension can be provided.

A separating device may be provided which can separate the threads or rovings between a molding tool and the grippers and/or a separating device which can separate the threads or rovings between a molding tool and the thread transfer points.

The grippers can assume different individual intermediate positions on their path, and can retain the respective origins of the threads or rovings at these intermediate positions. Various shapes can thereby be reproduced. And, only the amount of thread is tensioned by each gripper as is required for the respective location of the shape. The individual grippers can further be positioned on their path, following an outer contour of a molding tool. This means that the grippers hold on to the beginnings of the threads or rovings so that they are as close as possible to the point at which the fiber preform will have its edge at which the threads are separated after being formed on the molding tool. The grippers are therefore positioned where the respective threads or rovings leave the molding tool when it has been moved to the position for forming, or in the case of multi-part molding tools, when the molding tools have been moved together.

This results in very little scrap of expensive fiber material, even with complex structures, which is especially important in batch production.

The method according to the present invention generally includes the following steps:
  tensioning of threads or rovings for a first layer with the assistance of a plurality of grippers;
  draping of the first layer over a first molding tool;
  severing of the threads or rovings of the first layer;
  tensioning of threads or rovings for a second layer with the assistance of a plurality of grippers;
  draping of an additional layer over the first forming tool; and
  severing the threads or rovings of the second layer.

According to the method of the present invention, draping always occurs through the first molding tool travelling into the region of the tensioned threads or rovings, and the first molding tool after severing of the threads or rovings of the first layer and before draping of the additional layer, is rotated and/or tilted.

Tensioning occurs in such a way, for example, in that a plurality of separate grippers grip individual or a plurality threads or rovings at a plurality of thread transfer points allocated respectively to individual grippers. The grippers are then moved in substantially parallel paths relative to each other and the threads or rovings are thereby tensioned side by side. It is further feasible for several grippers to be moved simultaneously and independently of each other in one tensioning process. This allows the threads or rovings to be quickly tensioned parallel to each other and, in spite of this, each gripper can work independently.

The rotation around an axis occurs, for example, substantially perpendicular to the tensioned threads or rovings, and substantially parallel to the direction of movement during forward travel. The first molding tool may be rotated at an angle between 10 and 170°, for example between 30 and 150° or between 45 and 135°. The second molding tool can equally be rotated at an angle between 10 and 170°, for example between 30 and 150° or between 45 and 135°.

Moreover it is feasible between draping of the first layer and tensioning for the additional layer, to fix the first layer, for example through heating or pressing. This provides it with sufficient stability for the subsequent process steps or further processing. Each layer can be fixed after draping, in particular also the fiber preform after draping of the last layer. As mentioned, this occurs for example through activation of the binder material.

Fixing can begin directly during draping, that is during forward travel of the first or second molding tool, or afterwards. Severing of the threads or rovings can occur during fixing or after fixing.

A more precise shape can be achieved in that during draping a second molding tool, such as a hood, is brought together with the first molding tool so that the respective layer is formed and possibly fixed.

To produce a fiber preform having several layers of different fiber orientation, the same device can always be used for draping of the first and the additional layer. Between draping of the layers, the molding tool is accordingly rotated and/or tilted.

However, a production line including two or a plurality of devices may also be provided, wherein draping of the first layer occurs in one device, and wherein the first molding tool is then transferred to an additional device and the additional layer is draped in the additional device. Rotation or tilting of the molding tool with the layer on it can occur in the first or in the additional device. Thus, several layers can successively be placed in several devices until completion of the fiber preform. Herein, one layer may be placed in each device and also fixed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A is a partially exploded side view after tensioning the threads or rovings in the device of FIGS. 1A and 1B;

FIG. 2B is a top view after tensioning the threads or roving in the device of FIGS. 1A and 1B;

FIG. 4A is a side view after a second draping step of first layer in the device of FIGS. 1A and 1B;

FIG. 4B is a partially exploded top view after a second draping step of first layer in the device of FIGS. 1A and 1B;

FIG. 8C is a partially exploded top view after placement of yet another layer using the device of FIG. 8A;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

In accordance with an embodiment of the device and method according to the present invention, the inventive device is capable of carrying out the following process steps sequentially or partially parallel to one another:
  providing threads or rovings and possibly the binder material;

gripping the required threads or rovings and possibly the binder material;

tensioning the required threads or rovings by positioning the grippers accordingly;

first draping over a first molding tool;

second draping with a second molding tool;

fixing the layer of threads or rovings;

severing the threads or rovings on both sides of the molding tools;

rewinding the released and unused threads or rovings;

opening the molding tools;

rotating and/or passing forward a molding tool with the applied layer.

Repetition of the sequence above for placement of additional layers in the same device or in one or a plurality of additional inventive devices, then yields completion of the fiber preform.

Fibers, for example of carbon, glass, or aramid, or other fibers can be used as the fiber material for the threads or rovings. Thermoplastics or thermosetting plastics, epoxy resin, other plastics (polymers), or other resin may be considered as a matrix material for the fiber-reinforced plastic. The binder material can be thermoplastic or adhesive. It can either already be present as a hybrid thread or hybrid chloride roving, meaning that individual fibers or threads consist of binder material, or it can be with tensioned together with the threads or rovings by the gripper, or it may be applied or sprayed onto the draped threads or rovings.

Figure 1A:
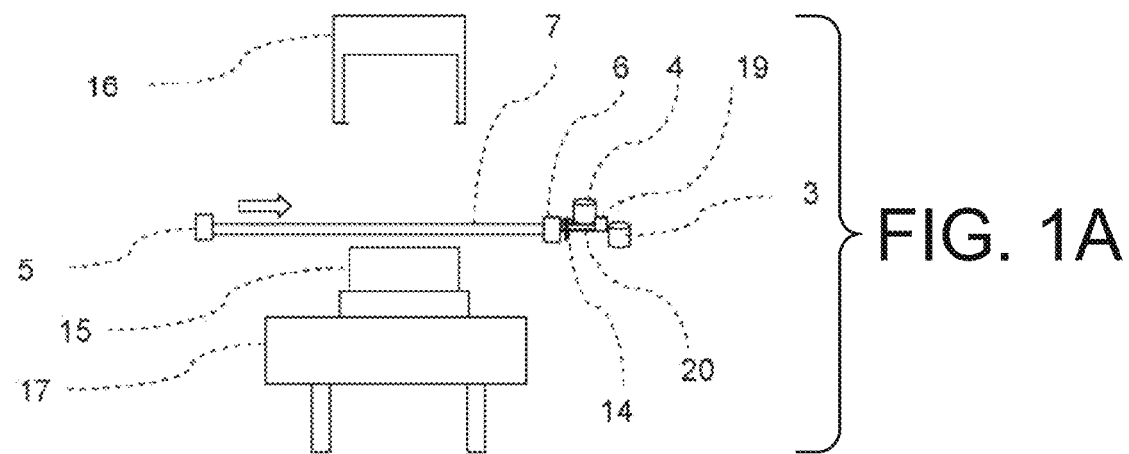
FIG. 1A is a partially exploded side view of a gripper capturing threads or rovings in a device according to the present invention.
Figure 1B:
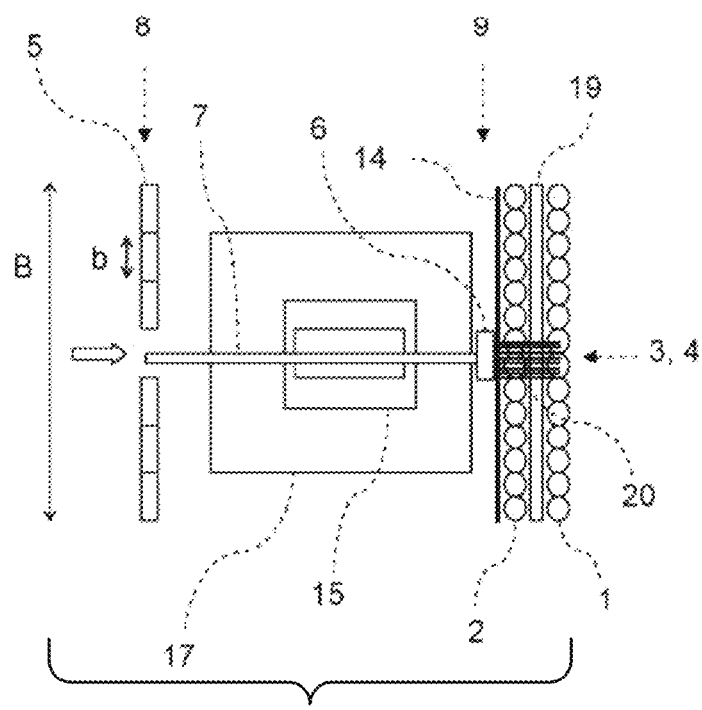
FIG. 1B is a partially exploded top view of a gripper capturing threads or rovings in the device of FIG. 1A.

The basic structure of the device is shown in FIGS. 1a and 1b. The provision of the threads or rovings occurs via a plurality of unwind stations in which the fiber material is provided in the form of spools or balls of thread (so-called bobbins), and which are arranged in several rows 1, 2 next to each other, behind one another or above one another. The spools can also form an upper and a lower row as shown in FIG. 1a. The origins of the threads or rovings 20 are shown schematically only in the respectively used region for used unwind stations 3, 4. All other origins are also threaded to the corresponding thread transfer points 14 so that they can be captured by the associated grippers in pick-up positions 9. Collectively this is also referred to as creel.

On the other side, grippers 5 are shown in their maximum positions 8, which in this case also correspond to the initial positions. The clamping width of a gripper is b, and the total clamping width of all grippers is B. Even if only grippers having equal widths are illustrated, grippers having different widths are of course possible. The grippers do not necessarily have to have their maximum and pick-up positions in one line. Moreover, first molding tool 15 is illustrated on lifting table 17, and second molding tool 16, which is formed as a hood shown in the starting position—in other words outside the paths of the grippers. The second molding tool is not shown in the top view. And a corresponding moving or lowering device for the second molding tool is also not specifically shown. Moreover, binder material supply 19 is provided which can be arranged for example, between the rows of unwind stations.

One gripper 6 is located in the pick-up position and fetches the threads or rovings corresponding to its position in the device by grasping their origins. Gripper 6 is movable by guide device 7, for example a rod assembly or a piston. The grippers can move individually, however only linearly and on parallel paths adjacent to each other, between the pick-up and the maximum position. Thus, a simple automation and a fast parallel movement is possible. As illustrated, several unwind stations can be combined into a group and be allocated to one gripper. One gripper can grasp a multiple threads or rovings together. In any event, at least as many unwind stations as there are grippers should be provided.

Referring now to FIGS. 2a and 2b, there is illustrated tensioned threads or rovings 21, which gripper 10 has withdrawn through its movement into its intermediate position. This can be assisted by actively driven unwinding. The intermediate position is located close to the outer contour of the molding tools or respectively near the subsequent position of the outer contour, when the molding tools are brought into their draping position. Binding material 18, for example in the form of binder threads or binder fleeces, can also be tensioned by the gripper together with the threads or rovings. As illustrated, the arrangement may include an upper and a lower row of unwind stations, so that the binder material is tensioned between the upper and the lower group of threads or rovings. During pulling out, the binder material can be pre-activated in the region of thread transfer points 14, for example by a heating device, so that the threads or rovings are already somewhat fixed to each other in the region of thread transfer points 14, immediately at the beginning of the draping process. Furthermore, a spreader device may be provided in the region of the thread transfer points which may be formed as a kind of comb having one or more rows of tines. This ensures that the threads or roving are positioned adjacent to each other and do not slip sideways even during subsequent draping. The spreader device may also be displaceable along the thread paths or along the gripper paths. Shown also is a possibility for a thread tensioning measuring device 13.

Draping is to be understood to be the reshaping or forming into shape the threads or rovings by a molding tool. Draping may occur in one or more stages in that the molding tool or tools are moved simultaneously or consecutively in the layer of the tensioned threads or rovings. During the draping process the thread tensions may be regulated, for example kept constant. This means that the amount of threads or rovings is released as is necessary for draping at the respective position of the molding tool. To be able to achieve this, brake and clutch devices can be provided. For example, appropriate controls may be assigned to each unwind station or each group of unwind stations. This prevents the threads or rovings becoming overburdened or being laid too loosely. The thread tensions can also be measured by suitable measuring devices in the region of the thread transfer points and/or between the unwind stations and the thread transfer points. For example, the value of the thread tensions is in a range between approximately 1 and 50 Newtons per meter squared ($N/m^2$).

Figure 3A:
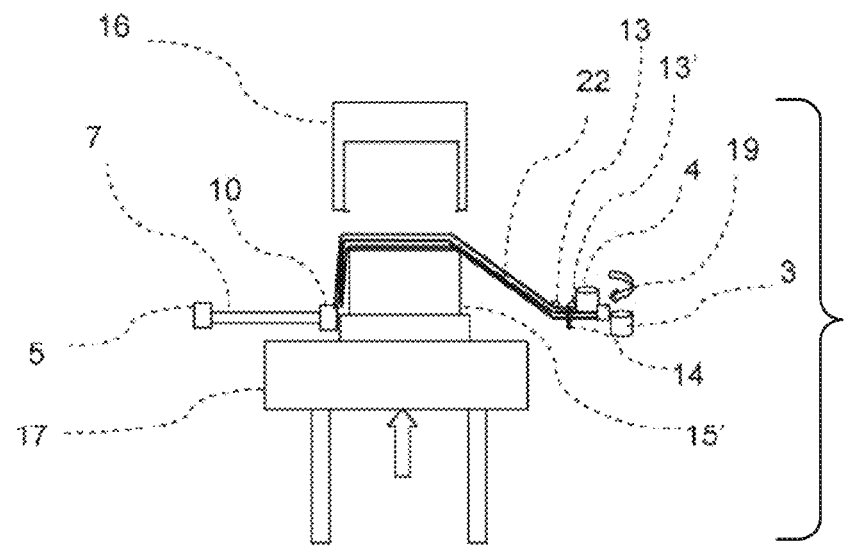
FIG. 3A is a partially exploded side view after a first draping step of first layer in the device of FIGS. 1A and 1B.
Figure 3B:
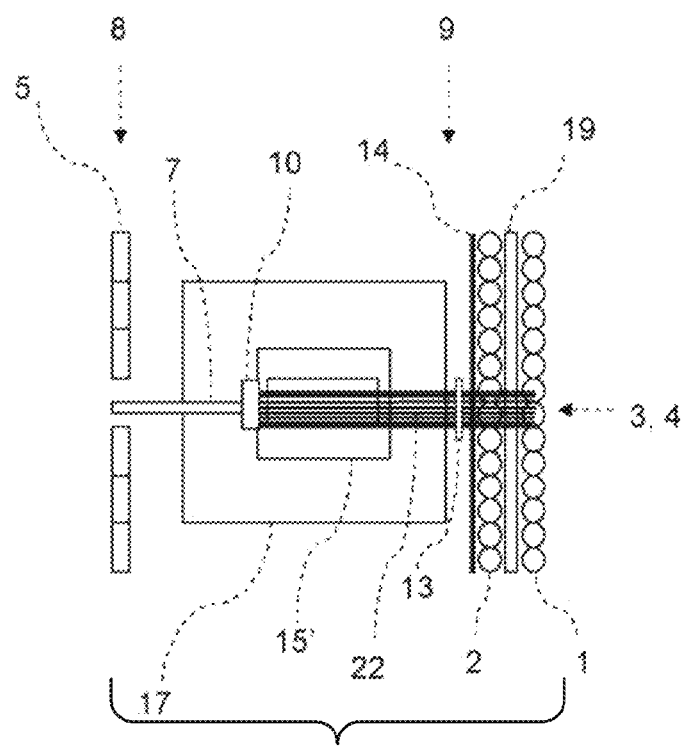
FIG. 3B is a partially exploded top view after a first draping step of first layer in the device of FIGS. 1A and 1B.

Referring now to FIGS. 3a and 3b, there is illustrated the condition after the first draping. Molding tool 15' is moved from lifting table 17 into the draping position. The threads or rovings 22 are thereby deflected and draped over molding tool 15'. Gripper 10 secures the beginning of the threads near the outer contour of molding tool 15'. After this step, binder material may be applied or sprayed on the threads or rovings, alternatively or additionally.

In the next step the threads or rovings are further draped or reshaped by second molding tool 16' which has been moved to its draping position. (FIGS. 4a and 4b). Through the interaction of the two molding tools, between which the layer of threads or rovings is located, accurate shaping is possible. The molding tools can also be pressed together, and one, for example the second, or both of the molding tools may be heated so that the binder material is activated and the threads or rovings are fixed to a dimensionally stable layer. Simultaneously with or after fixing, the threads or rovings are cut at both sides of the molding tools, in other words between the gripper and molding tool and between the thread transfer points and molding tool. In one embodiment the separating device may be connected with the first or second molding tool. The separation may occur at least on the side of the thread transfer positions close to the molding tool. This creates only a small amount of scrap of expensive fiber material and less rework of the fiber preform is necessary.

The severed threads or rovings 23 may be retracted and rewound or stored temporarily by a suitable thread guide. Rewinding occurs in such a way that the beginnings of the threads or rovings in thread transfer points 14 are again positioned so that they can be picked up by the grippers without too much scrap material being created. To detect the beginnings, sensors can be used.

Figure 5A:
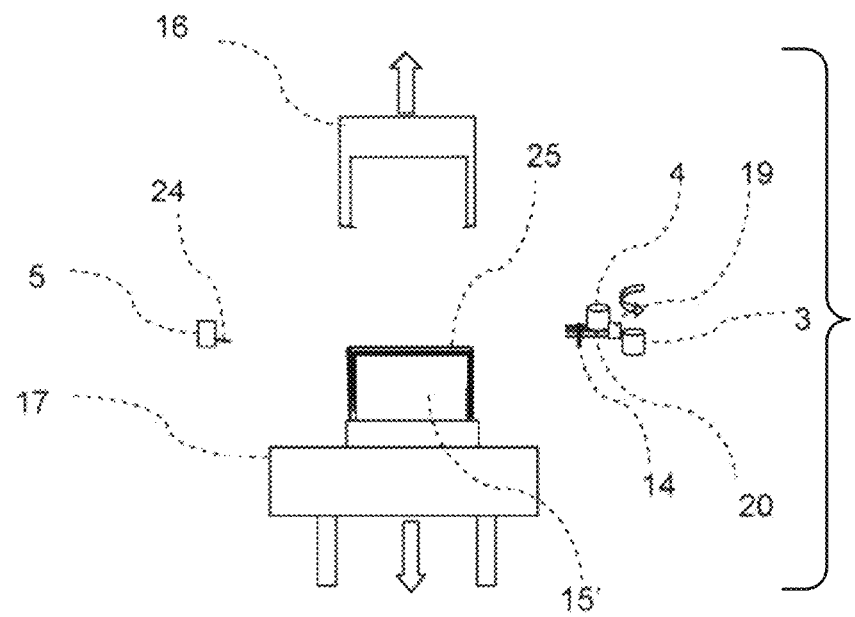
FIG. 5A is a partially exploded side view after severing of threads or rovings in the device of FIGS. 1A and 1B.
Figure 5B:
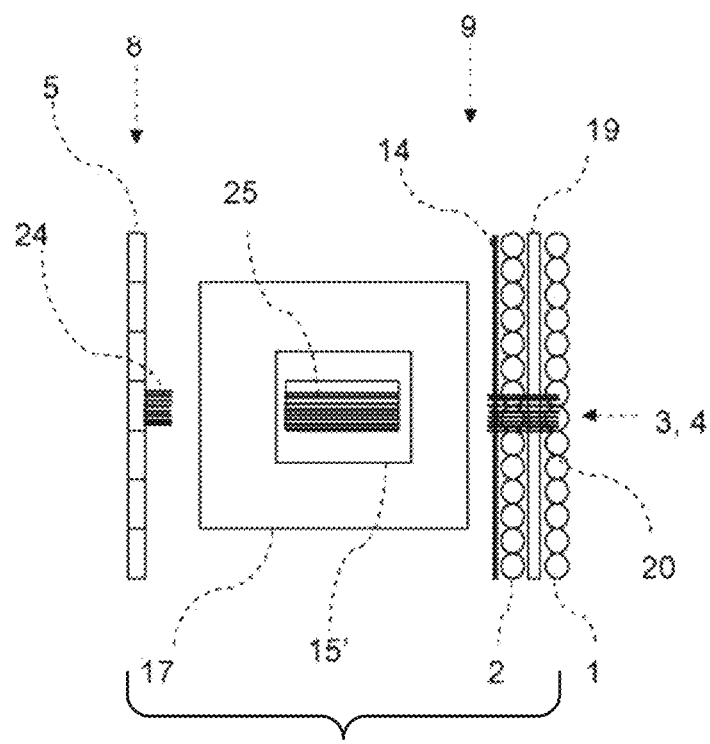
FIG. 5B is a partially exploded top view after severing of threads or rovings in the device of FIGS. 1A and 1B.

Referring now to FIGS. 5a and 5b, the threads or rovings are already rewound or cut off at the thread transfer point, so that beginnings are located again at the thread transfer points. Only a small amount of scrap 24 fiber material is generated at the grippers, as they were positioned respectively closely to and along the outer contour of the molding tooling tools and tensioned only as much thread as was needed. Molding tools 15, 16 are returned to their starting position. The first formed layer 25 remains on the first molding tool.

Figure 6A:
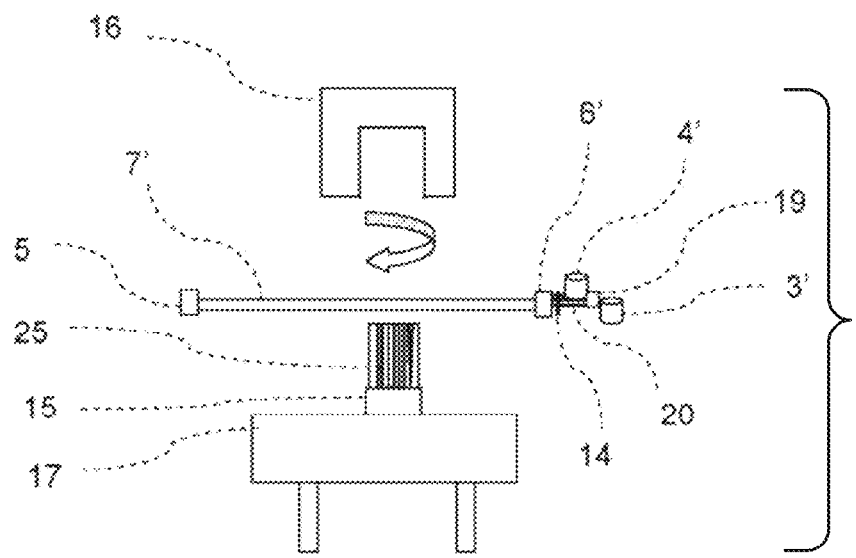
FIG. 6A is a partially exploded side view after turning the molding tools, and the gripper picking up threads or rovings for the second layer in the device of FIGS. 1A and 1B.
Figure 6B:
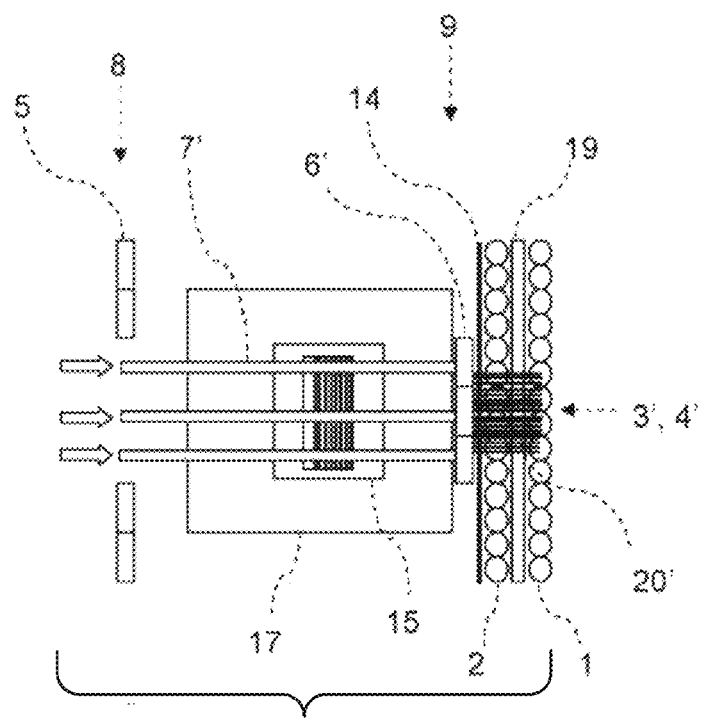
FIG. 6B is a partially exploded top view after rotating the molding tools and the gripper picking up threads or rovings for the second layer in the device of FIGS. 1A and 1B.

Referring now to FIGS. 6a and 6b, there is shown first and second molding tools 15, 16 in a rotated position. Here they were rotated by 90°. However, a different angle of rotation of approximately 30°, 45°, 60°, or tilting is also possible. The angle of rotation may, for example, be in a range between approximately 10 and 170°. This depends on how and with what fiber orientation the additional layer of threads or rovings is to be placed. Required grippers 6' are in the pick-up position in order to grip beginnings 20 of the used threads or rovings.

Then, the threads or rovings of the additional layer are tensioned to an intermediate position of the grippers, and draped in that the first and the second molding tools 15', 16' are moved into the draping position.

Figure 7A:
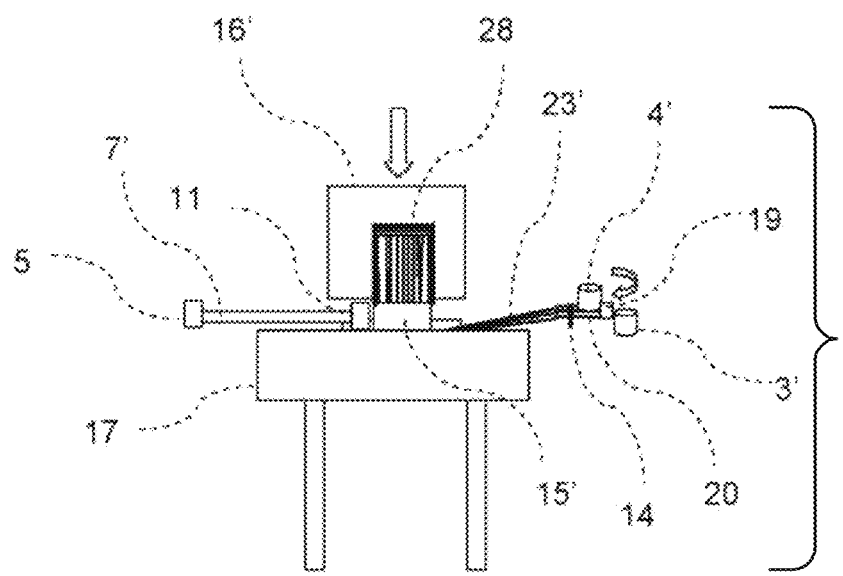
FIG. 7A is a side view after a second draping step of second layer in the device of FIGS. 1A and 1B.
Figure 7B:
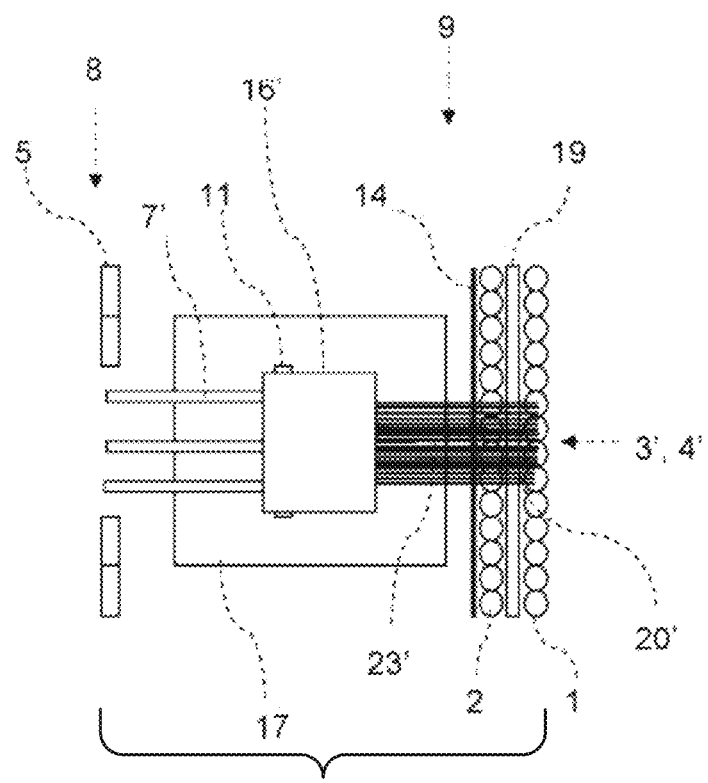
FIG. 7B is a partially exploded top view after a second draping step of second layer in the device of FIGS. 1A and 1B.

In FIGS. 7a and 7b, there is shown the device after the threads or rovings were severed. Used grippers 11 are in an intermediate position. In the case of non-rectangular molding tools or other angles of rotation, grippers 11 may also be in different intermediate positions. The additional layer of threads or roving, and possibly of binder material may also be fixed dimensionally stable in its shape and joined with the first layer by heating and/or pressing. Together they form fiber preform 28.

Figure 8A:
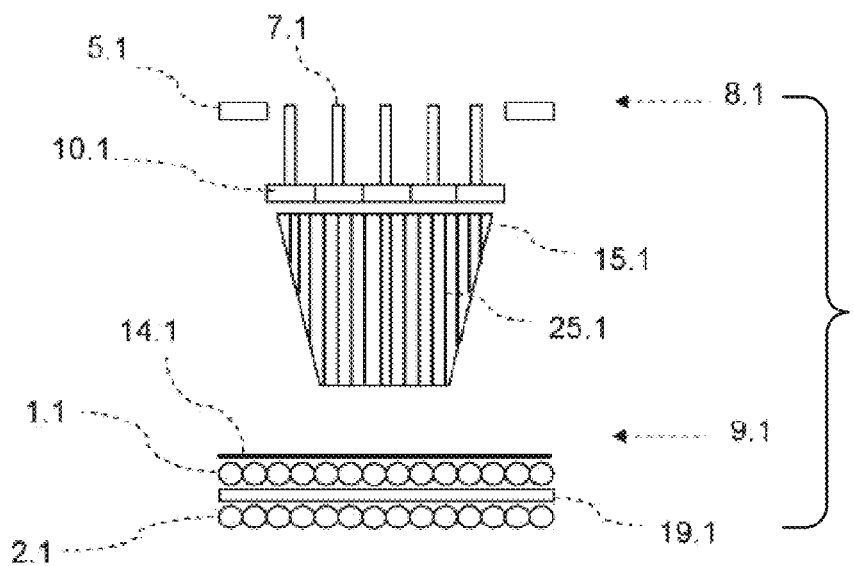
FIG. 8A is a partially exploded top view after placement of first layer according to a second embodiment of the present invention.

FIG. 8 illustrates an additional embodiment, as used for example in the manufacture of fiber preforms for engine hoods. Used grippers 10.1 are at an intermediate position and unused grippers 5.1 are in maximum position 8.1. On first molding tool 15.1, a first layer of threads or rovings is draped and fixed. The second molding tool is not illustrated. The supply of the threads or rovings occurs in unwind station 1.1, 2.1. Moreover, binder material supply 19.1 and 14.1 is available at thread transfer points 14.1.

Placement of one or several additional layers can occur in the same device, or in one or a plurality of other devices according to the present invention, to which the first molding tool is transferred along with the first layer.

Figure 8B:
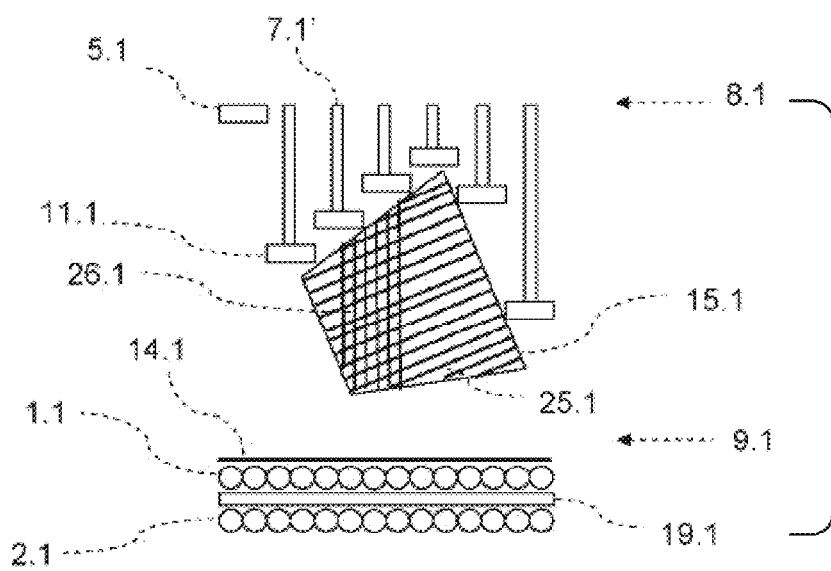
FIG. 8B is a partially exploded top view after placement of an additional layer using the device of FIG. 8A.

In FIG. 8b additional layer 26.1 is draped on the rotated molding tool. For the sake of clarity only a few threads or rovings are shown. Used grippers 11.1 are positioned along the outer contour of the molding tool, thereby defining it as precisely as possible. For even more precise adaptation, narrower or wider grippers can be used.

FIG. 8c further shows placement of yet another layer. Used grippers 12.1 are positioned again along the outer contour. Fixing the layers together create fiber preform 28.1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1, 1.1, 2, 2.1 rows of unwind stations
3, 3', 4, 4' unwind stations in use
5, 5.1 row of grippers
6, 6' grippers in pick-up position
7, 7.1, 7', 7.1' guide device for grippers
8, 8.1 location of the maximum positions
9, 9.1 location of pick-up positions
10, 10.1, 11,
11.1, 12, 12.1 grippers in intermediate positions
13, 13' measuring device for thread tension
14, 14.1 thread transfer points
(possibly also with spreading device and/or device for binder pre-activation)
15 first molding tool in start position
15', 15.1 first molding tool in draping position
16 second molding tool in start position
16' second molding tool in draping position
17 lift table
18 binder material
19, 19.1 binder material supply
20, 20' beginnings of threads or rovings
21 tensioned threads or rovings
22 draped threads or rovings
23, 23' severed threads or rovings
24 scrap
25 first layer of threads or rovings
26.1, 27.1 additional layer of threads or rovings
28, 28.1 fiber preform
b clamping width of a gripper
B overall clamping width of all grippers

What is claimed is:

1. A device for producing a plurality of fiber preforms, the device comprising:
    a plurality of unwind stations for providing a plurality of threads or rovings;
    a plurality of grippers, each of said grippers being movable on a path between a maximum position and a pick-up position provided at a thread transfer point, said pick-up position being closer to one of said unwind stations than said maximum position, said plurality of grippers configured for gripping an origin of one of an individual or a plurality of said threads or rovings;
    at least one first molding tool having a draping position in a region of a plurality of connecting lines between said maximum position and said thread transfer point of each of said plurality of grippers and a starting position outside said connecting lines, said at least one first molding tool being at least one of rotatable and tiltable at least in said starting position and said at least one first molding tool being movable into a respective draping position when at least one of rotated and tilted.

2. The device according to claim 1, further comprising a second molding tool having a starting position of its own, said second molding tool configured to be brought together with said at least one first molding tool in said draping position.

3. The device according to claim 2, wherein a direction of movement between said starting position of at least one of said second molding tool and said at least one first molding tool is arranged substantially perpendicular to said paths of said plurality of grippers.

4. The device according to claim 2, wherein said second molding tool is at least one of rotatable and tiltable at least in said starting position of said second molding tool and is movable in said at least one of said rotated and said tilted position into said draping position.

5. The device according to claim 2, wherein said second molding tool is a hood configured to fit over said at least one first molding tool, said second molding tool defining a gap for said plurality of threads or rovings with said at least one first molding tool.

6. The device according to claim 3, wherein an axis of rotation of at least one of said second molding tool and said at least one first molding tool is positioned substantially perpendicular to said paths of said plurality of grippers and substantially parallel to said direction of movement between said starting position and said draping position.

7. The device according to claim 2, wherein at least one of said second molding tool and said at least one first molding tool is equipped with a heating device.

8. The device according to claim 2, wherein at least one of said second molding tool and said at least one first molding tool is equipped with a pressing unit.

9. The device according to claim 2, further comprising a motion device, at least one of said second molding tool and said at least one first molding tool being attachable and detachable from the device.

10. The device according to claim 9, said motion device being one of a lifting table and a lowering device.

* * * * *